United States Patent [19]

Borom et al.

[11] 4,280,932
[45] Jul. 28, 1981

[54] MAGNESIA INSULATED HEATING ELEMENTS

[75] Inventors: Marcus P. Borom, Schenectady, N.Y.; John Schultz, Jr., Louisville, Ky.

[73] Assignee: General Electric Company, Schenectady, N.Y.

[21] Appl. No.: 152,369

[22] Filed: May 22, 1980

Related U.S. Application Data

[62] Division of Ser. No. 11,068, Feb. 12, 1979, Pat. No. 4,234,786.

[51] Int. Cl.³ .................. C03C 3/14; C03C 35/04; H02C 1/03
[52] U.S. Cl. .................. 252/521; 106/47 R; 106/58; 106/62; 106/306; 174/102 P; 252/500; 338/238
[58] Field of Search ............. 106/62, 306, 47 R, 58; 252/521; 174/102 P; 338/238

[56] References Cited

U.S. PATENT DOCUMENTS

| 2,292,065 | 8/1942 | Elsey | 174/102 P |
|---|---|---|---|
| 3,061,752 | 10/1962 | Banks | 106/47 R X |
| 3,258,434 | 6/1966 | Mackenzie et al. | 252/521 X |
| 3,378,362 | 4/1968 | Mackenzie | 106/47 R X |
| 3,380,838 | 4/1968 | Sack | 106/48 X |
| 3,457,092 | 7/1969 | Tervo | 106/58 X |
| 3,615,324 | 10/1971 | Gordon | 174/102 P |

FOREIGN PATENT DOCUMENTS

528677 11/1940 United Kingdom ................ 174/102 P

OTHER PUBLICATIONS

Ceramic Bulletin 46 (1967) p. 641.
Coughanour, L. W. et al., "Viscosity, Density, and Electrical Resistivity of Molten Alkaline–Earth Borate Glasses with 3 Mole% of Potassium Oxide", J. Am. Cer. Soc. 41 (1958), pp. 324–329.
Owen, A. E., "Properties of Glasses in the System CaO—$B_2O_3$—$Al_2O_3$, Part 1, The d.c. Conductivity and Structure of Calcium Boroaluminate Glasses", Physics and Chemistry of Glasses 2(3) (1961), pp. 87–98.

*Primary Examiner*—Helen M. McCarthy
*Attorney, Agent, or Firm*—Jane M. Binkowski; James C. Davis, Jr.; Leo I. MaLossi

[57] ABSTRACT

Compacted, granular, fused magnesia used as thermally-conducting electrical insulation in tubular, electrical resistance elements is substantially improved in thermal conductivity through the addition of 0.1 to 10.0 percent of a glass comprising CaO, $B_2O_3$ and optionally $Al_2O_3$.

3 Claims, 4 Drawing Figures

MAGNESIA INSULATED HEATING ELEMENTS

This is a division of application Ser. No. 11,068, filed Feb. 12, 1979, now U.S. Pat. No. 4,234,786.

BACKGROUND OF THE INVENTION

The present invention relates generally to tubular, electrical-resistance, heating elements and is more particularly concerned with novel sheathed elements having superior performance characteristics, with a method of making these novel elements, and with a new magnesia-base composition having special utility as a thermally-conducting, electrically-insulating, packing material in these elements.

Heating elements of the type comprising an inner, electrically-resistive conductor, a surrounding layer of magnesia electrical insulation, and an outermost protective jacket are widely used in many industrial heating devices as well as in devices such as domestic ranges, dishwashers and water heaters. This type of heating element is much more durable than, for example, exposed resistance wire. Structurally, it usually includes: (1) a coiled resistance wire composed of alloys such as those made up of 20 percent chromium and 80 percent nickel; (2) compacted magnesia powder containing minor amounts of impurities surrounding the resistance coil as an insulator; and (3) an outer protective metal jacket.

Over the long period in which such elements have been in general use, they have been developed and improved to a state of good performance and service life, meeting high safety standards and competing with consistent success with gas and high-frequency current heating devices. At the same time, however, it has long been recognized that a substantial increase in the thermal conductivity of the magnesia insulation employed in these elements would be desirable. Increased thermal conductivity results in decreased wire temperature, a significant factor in length of service life of these elements. This objective, however, would have to be realized without incurring any substantial offsetting disadvantage of cost of production or operation, impairment of efficiency of these elements, or significantly reduced electrical resistance.

BRIEF DESCRIPTION OF THE INVENTION

In accordance with this invention, tubular heating elements having superior operating characteristics can be produced. Moreover, no substantial modification of the principal operations involved in commercial production is required in the manufacture of these elements.

This invention is predicated upon the discovery that certain materials in particulate form, when added in amounts as small as 0.1 percent to granular, fused magnesia, improve thermal conductance without significantly affecting electrical leakage.

More particularly, it has been found that an improved thermally-conducting filler for sheathed electric resistance heaters can be formed from a uniform mixture of granular magnesia and a minor but effective amount of a glass which has a glass transition temperature below about 700° C. and resistivity greater than about $10^7$ ohm-cm at 600° C. Cabal glasses are such materials and they are composed of calcia (CaO), boron oxide ($B_2O_3$) and optionally alumina ($Al_2O_3$). Such glass is believed to bridge between particles of magnesium oxide so as to reduce the barrier to heat transfer normally present at such interfaces. Surprisingly, the glass does not appreciably reduce the electrical properties of the insulation. A large loss in electrical insulation would be expected as most common glasses become very poor insulators at range element operating temperatures (750°–1100° C.) and thus the glass addition would be expected to reduce electrical resistance drastically.

However, since the preferred glasses possess electrical resistivities higher than those of more ordinary glasses and since the improved thermal conductance of the magnesia-glass insulating mix lowers the average operating temperature of a sheated heater, electrical leakage in an operating unit is not drastically reduced, and, in fact, can even show an improvement.

Glasses which are not useful in accordance with this invention are those which are refractory and those which are composed of oxides not thermodynamically stable under the very low oxygen partial pressures prevailing within these tubular heating elements and normal operation. Thus fused silica, for example, does not meet the former requirement, and glasses containing oxides of copper, lead, nickel, cobalt or silver fail to meet the latter requirement. On the other hand, alkali metal silicate glasses and alkaline earth metal silicate glasses as well as borate and borosilicate glasses meet both these requirements, but even so only those having resistivity greater than about $10^7$ ohm-cm at 600° C. are useful in the practice of this invention.

DETAILED DESCRIPTION OF THE INVENTION

Figure 1:
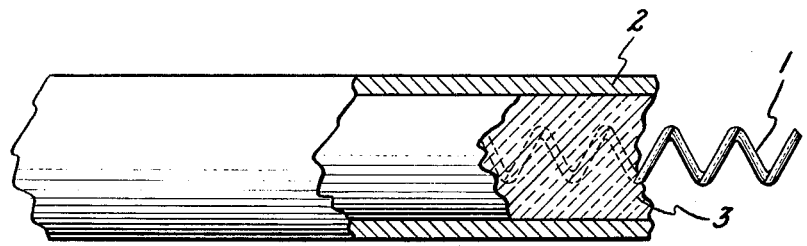
FIG. 1 is an enlarged, side-elevational view of the heating element of the invention, portions being broken away for purposes of illustration.

Referring now to the drawings, FIG. 1 is a conventional tubular heater comprising a helical resistance wire 1 disposed within an outer protective metal jacket 2 and is embedded in and spaced from the jacket by compacted magnesia powder and Cabal glass which provides both good electrical resistivity and superior thermal conductivity. The element is fabricated in accordance with the usual practice in the art whereby after assembling the parts the element is conditioned at an elevated temperature of about 1100° C. The filler composition of the invention can comprise from about 0.1% to about 10.0% and preferably from about 0.25% to about 2% of a glass comprising from about 10 to about 50 mol percent CaO from about 30 to about 90 mol percent $B_2O_3$ and from about 0 to about 30 mol percent $Al_2O_3$. Minor amounts of other ingredients can be employed but the filler should be substantially free of conductive materials such as iron, alkalis, and/or easily reducible oxides such as lead oxide and zinc oxide. Reducible oxides should be avoided since oxygen pressures of below about $10^{-15}$ atmos. can occur. Two preferred glasses comprise the ingredients and proportions enumerated in the following Table I:

TABLE I
COMPOSITIONS OF PREFERRED GLASSES

| | Composition in mole % | |
|---|---|---|
| | Cabal #1 | Cabal #2 |
| CaO | 42.2 | 25.9 |
| $B_2O_3$ | 42.1 | 61.4 |
| $Al_2O_3$ | 15.7 | 12.7 |

Figure 2:
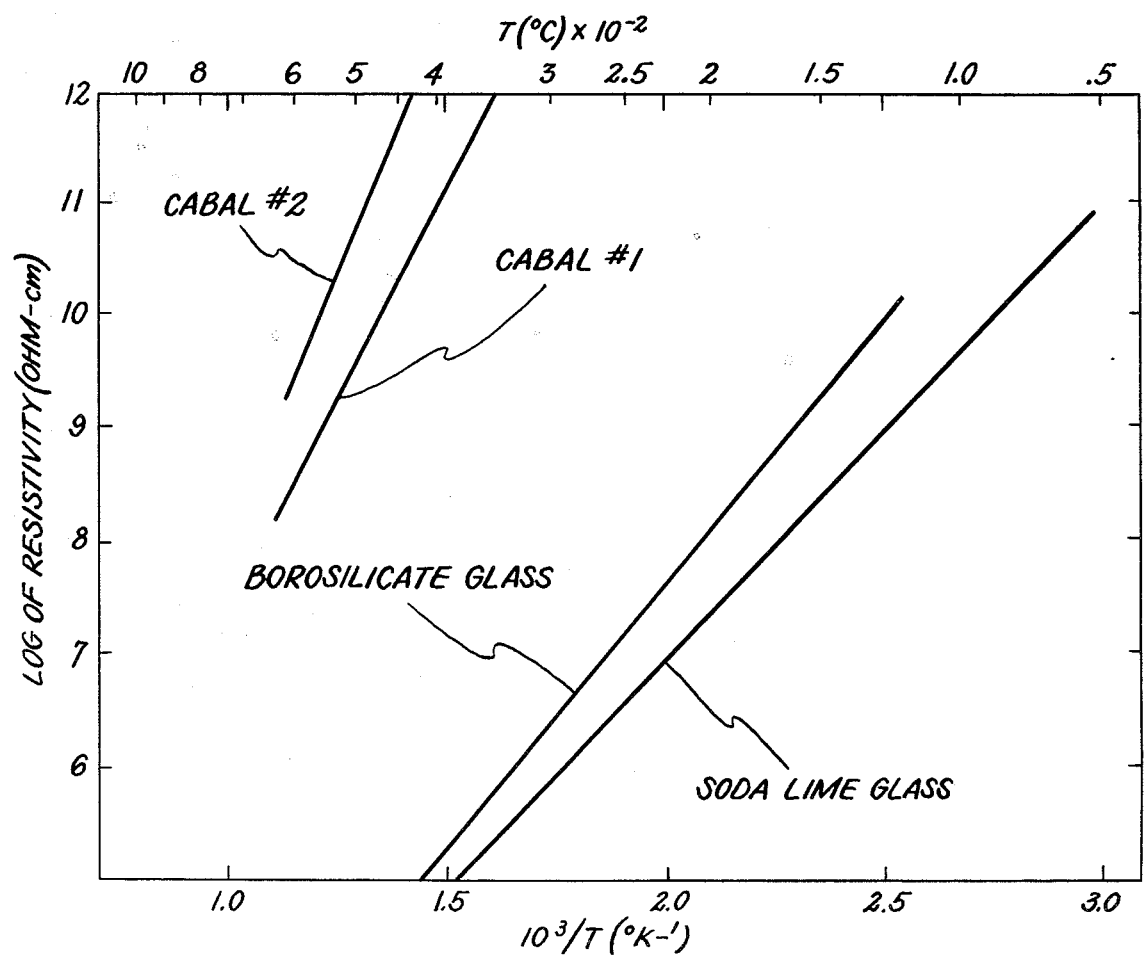
FIG. 2 is a chart bearing curves comparing the specific impedance or resistivity of Cabal glasses with conventional commercial glasses.

From the data reported in FIG. 2, it can be seen that the Cabal glass additive should have a resistivity greater than $10^7$ ohm-cm at 600° C.

The mixture may include a wide variety of particle sizes both of magnesia and the Cabal glass or other similar glass as described above, the magnesia preferably, however, being a mixture of particle sizes from 40 mesh to below 325 mesh (U.S. standard screen series). The Cabal or similar glass is of a particle size not larger than that of the largest magnesia particles of the mixture at the outset of the compaction operation and preferably finer than 100 mesh. Also, as indicated above, a mixture of additives can be employed providing they meet the foregoing requirements.

The following examples will serve to illustrate the invention and preferred embodiments thereof. All parts and percentages in said examples and elsewhere in the specification and claims are by weight unless otherwise specified.

EXAMPLES

For evaluation of the invention, units were constructed from iron-nickel-chromium alloy tubes of 0.315 inch outside diameter, 0.020 inch wall thickness, and 15 inches long. Helices were of 23 ga nickel-chromium alloy wire wound on an 0.074 inch mandrel. They were spot welded to terminals of stainless steel tubing of 0.094 inch outside diameter. The tubes were installed vertically in the loading fixture and the helix stretched centrally within the tube. A 24 ga but welded Chromel-Alumel thermocouple was stretched longitudinally within the helix. The junction was maintained at the mid-point of the sheath tube length and either end extended through the terminal tubes. Ceramic thermocouple tubing centered the thermocouple wires within the terminal tubes and isolated the thermocouple from the terminals. The unit was loaded with an intimate mixture of GE No. 12701 grade magnesium oxide and Cabal glass and the tube vibrated to compact the mixture. Ceramic seals and polyethylene washers were used on both ends of the units. After loading, the units were roll-reduced to approximately 0.272 inch outside diameter and annealed at a temperature of approximately 1080° C. for approximately 12 minutes with exothermic gas. Based on a calculation of sheath length within the hot zone of each unit, the unit was energized at 48.6 watts/inch and internal and external temperatures measured by means of the respective thermocouples. The thermal conductivity was then calculated.

Figure 3:
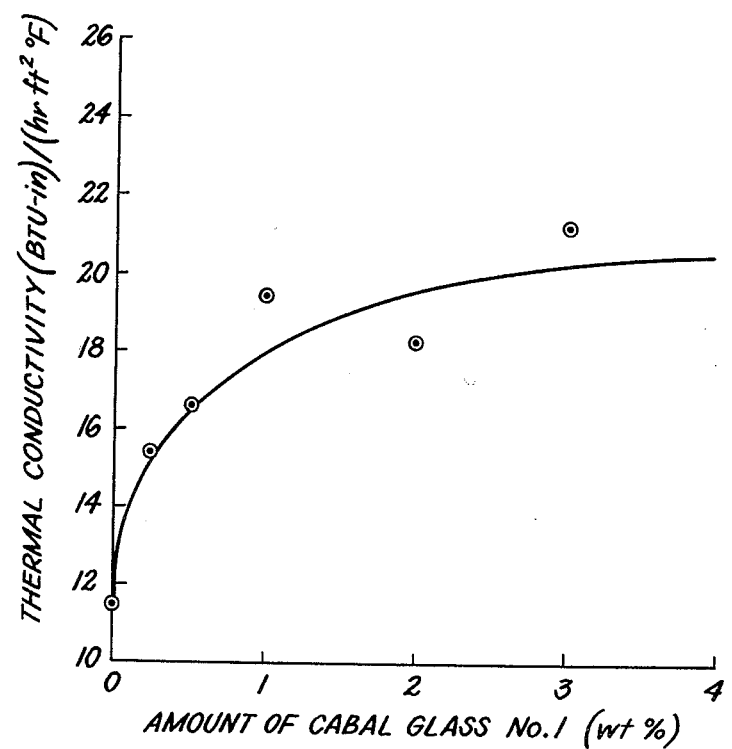
FIG. 3 is a chart showing the improvement in thermal conductivity of magnesia insulation with additions of Cabal glass #1.
Figure 4:
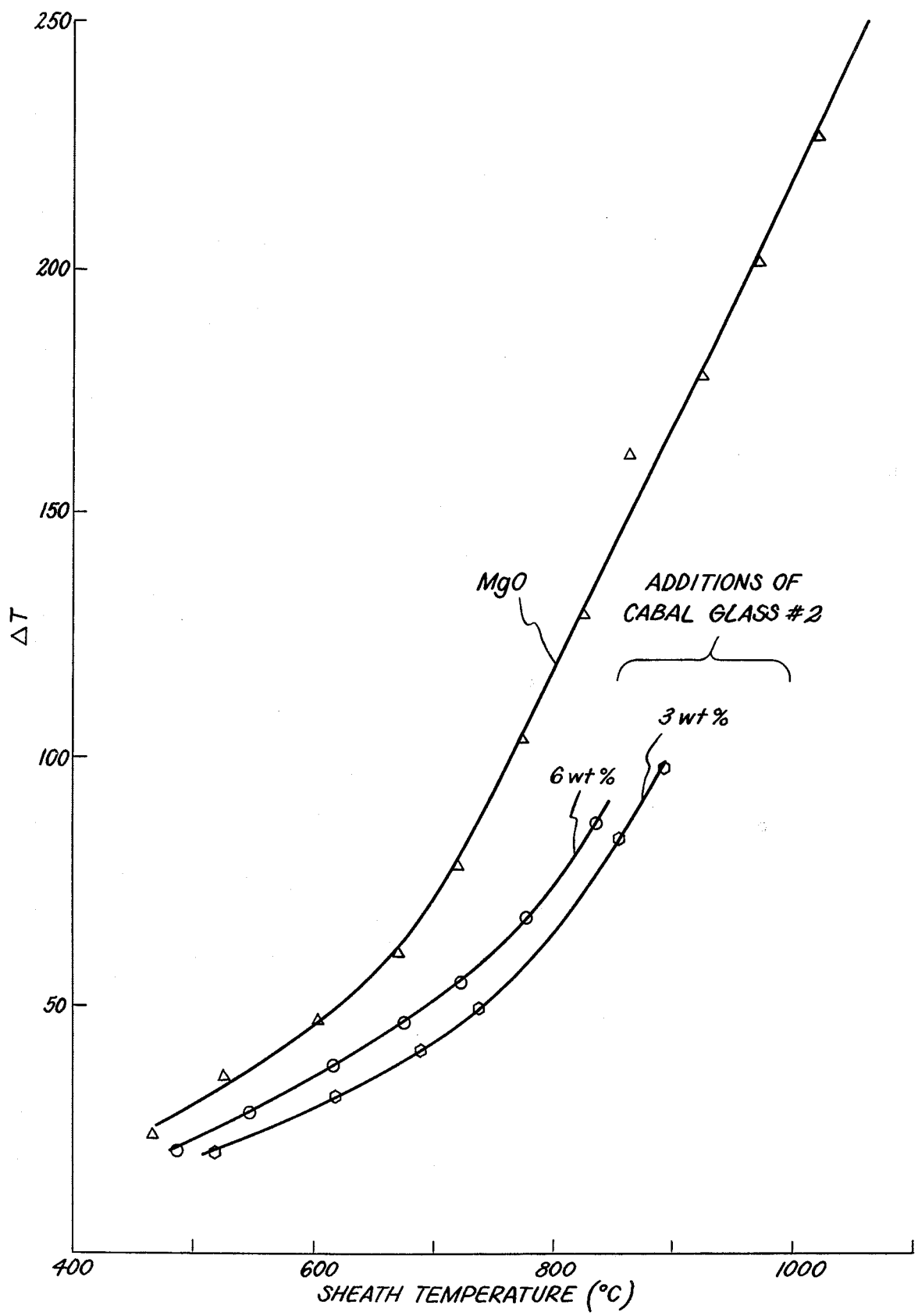
FIG. 4 is a chart bearing curves showing the temperature difference between the outside of the sheath and inside of the helix in which typical magnesia insulation is compared with magnesia insulation of the invention.

Compositions were prepared by adding amounts ranging from 0.25 percent to 3 percent Cabal glass No. 1 of −200 mesh particle size to magnesium oxide of −40 mesh particle size. The mixtures were incorporated into heater sheaths in accordance with the aforesaid procedure and the results for a plurality of heaters plotted and compared with a heater containing only magnesium oxide as the insulating material, which data is presented in FIG. 3. As can be seen, the thermal conductivity for units containing only magnesium oxide is found to be 11.5 whereas a unit containing 0.25 percent Cabal glass has a thermal conductivity of 14.7 and a unit containing 3 percent Cabal glass has a thermal conductivity of 21.6 BTU-in./hr.-ft.$^2$-°F. Similarly, as shown in FIG. 4, compositions of the invention incorporating 3 to 6 weight percent of Cabal glass No. 2 are approximately twice as thermally conductive as the prior art magnesia compositions, permitting lower heater element temperatures and longer heater element life.

While the above examples are meant to be illustrative of the invention, it will be apparent to those skilled in the art that obvious modifications can be made without departing from the scope of the invention and accordingly the invention is intended to be limited only by the appended claims.

With regard to FIG. 2, the soda lime glass and the borosilicate glass noted in the Legends are products of Corning Glass Works marketed under numbers 0080 and 7740, respectively.

We claim as our invention:

1. An electrically insulating filler showing improved thermal conductance without significantly affecting electrical leakage and having special utility as a thermally-conducting and electrically-insulating filler for sheathed electric-resistance heaters consisting essentially of a uniform mixture of granular fused magnesia and from about 0.1% to about 10% of a glass having resistivity greater than about $10^7$ ohm-cm at 600° C. and additionally having a glass transition temperature range below about 700° C. and being thermodynamically stable in the presence of oxygen partial pressure of $10^{-15}$ atmosphere in the temperature range of 750° to 1100° C. wherein the glass consists essentially of from about 10 to about 50 mol percent CaO, from about 30 to about 90 mol percent $B_2O_3$, and from about 0 to about 30 mol percent $Al_2O_3$, said filler being substantially free of electrically conductive metal materials, alkalis and/or easily reducible metal oxides.

2. The composition of claim 1 wherein
    the glass comprises 42.2 mol percent CaO, 42.1 mol percent $B_2O_3$, and 15.7 mol percent $Al_2O_3$.

3. The composition of claim 1 wherein
    the glass is present in an amount from about 0.25% to about 2%.

* * * * *